US012525704B2

(12) United States Patent
Xing et al.

(10) Patent No.: US 12,525,704 B2
(45) Date of Patent: Jan. 13, 2026

(54) MOBILE TERMINAL

(71) Applicant: JRD COMMUNICATION (SHENZHEN) LTD., Guangdong (CN)

(72) Inventors: Hongjuan Xing, Guangdong (CN); Longjie Yu, Guangdong (CN); Hai Cai, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 308 days.

(21) Appl. No.: 18/249,749

(22) PCT Filed: Dec. 3, 2020

(86) PCT No.: PCT/CN2020/133629
§ 371 (c)(1),
(2) Date: Apr. 20, 2023

(87) PCT Pub. No.: WO2022/082935
PCT Pub. Date: Apr. 28, 2022

(65) Prior Publication Data
US 2023/0387572 A1 Nov. 30, 2023

(30) Foreign Application Priority Data
Oct. 21, 2020 (CN) ......................... 202011132581.6

(51) Int. Cl.
*H01Q 1/24* (2006.01)
*H01Q 5/335* (2015.01)
(Continued)

(52) U.S. Cl.
CPC ............. *H01Q 1/243* (2013.01); *H01Q 5/335* (2015.01); *H01Q 9/0421* (2013.01); *H01Q 21/0006* (2013.01)

(58) Field of Classification Search
CPC ...... H01Q 1/243; H01Q 5/335; H01Q 9/0421; H01Q 21/0006; H01Q 9/42; H01Q 21/28;
(Continued)

(56) References Cited

U.S. PATENT DOCUMENTS

2020/0106166 A1* 4/2020 Wu ........................ H01Q 5/364
2020/0136268 A1* 4/2020 Saeidi .................... H01Q 13/18

FOREIGN PATENT DOCUMENTS

CN 107331946 A 11/2017
CN 108987908 A 12/2018
(Continued)

OTHER PUBLICATIONS

Written Opinion of the International Search Authority in international application No. PCT/CN2020/133629, mailed on Jul. 22, 2021.

(Continued)

*Primary Examiner* — David E Lotter
(74) *Attorney, Agent, or Firm* — PV IP PC; Wei Te Chung

(57) ABSTRACT

A mobile terminal includes: a casing including a metal frame and a rear cover, wherein the metal frame is provided with a plurality of slots to divide the metal frame into a plurality of metal parts arranged at intervals; an antenna bracket being provided with a plurality of wirings; a first antenna assembly including a plurality of antenna structures, wherein the plurality of antenna structures are formed based on a plurality of metal parts arranged at intervals and a plurality of wirings, and a working frequency band of the plurality of antenna structures is a sub-6G frequency band; and a second antenna assembly including a plurality of millimeter-wave antenna modules, wherein a working frequency band of the plurality of millimeter-wave antenna modules is a millimeter-wave frequency band.

20 Claims, 10 Drawing Sheets

(51) Int. Cl.
*H01Q 9/04* (2006.01)
*H01Q 21/00* (2006.01)

(58) Field of Classification Search
CPC H01Q 1/242; H01Q 1/36; H01Q 1/44; H01Q 1/48; H01Q 1/50; H01Q 21/30; H04B 7/0413
See application file for complete search history.

(56) References Cited

FOREIGN PATENT DOCUMENTS

| | | | |
|---|---|---|---|
| CN | 109149074 | A | 1/2019 |
| CN | 109273865 | A | 1/2019 |
| CN | 110635244 | A | 12/2019 |
| CN | 110957586 | A | 4/2020 |
| CN | 110994156 | A | 4/2020 |
| CN | 210866496 | U | 6/2020 |
| EP | 3599661 | A1 | 1/2020 |

OTHER PUBLICATIONS

International Search Report in International application No. PCT/CN2020/133629, mailed on Aug. 18, 2021.
Chinese Office Action issued in corresponding Chinese Patent Application No. 202011132581.6 dated Apr. 25, 2021, pp. 1-8.
Notification to Grant Patent Right for Invention issued in corresponding Chinese Patent Application No. 202011132581.6 dated Feb. 11, 2022, pp. 1-4.

* cited by examiner

| antenna | | efficiency/dB | antenna | | efficiency/dB |
|---|---|---|---|---|---|
| low frequency 2×2 MIMO | main set | peak: -5.5 | n79 4×4 MIMO | main set | -5.7 |
| | sub set | Peak: -7 | | sub set | -6.4 |
| mid-high frequency 4×4 MIMO | main set | -7.3 | | MIMO | -7.5 |
| | sub set | -8.6 | | MIMO | -4.2 |
| | MIMO | -8 | Wi-Fi 2.4G | first path | -7.4 |
| | MIMO | -9 | | second path | -6.5 |
| n77 4×4 MIMO | main set | -7.4 | Wi-Fi 5G | first path | -5.3 |
| | sub set | -8.1 | | second path | -6.8 |
| | MIMO | -9.6 | GPS | L1 | -6 |
| | MIMO | -8 | | L5 | -5.8 |

| Operator | Working frequency | Peak EIRP/EIS | | EIRP/EIS_0.5CDF | | EIRP/EIS_0.5CDF | | EIRP/EIS_0.5CDF | |
|---|---|---|---|---|---|---|---|---|---|
| | | FS | | FS | | BHH | | H | |
| 3GPP/ATT/TMO US | n261 (28GHz) | 22.4 | -85.3 | 11.5 | / | / | / | / | / |
| | n260 (39GHz) | 20.6 | -82.7 | 8 | / | / | / | / | / |
| VZW | n261 (28GHz) | 23.9 +2 | -85.3 | 17.9 +2 | -81.8 | 13.9+2 | / | 15.9+2 | / |
| | n260 (39GHz) | 22.1 +1 | -82.7 | 16.1 +2 | -79.2 | 12.1+2 | / | 14.1+2 | / |
| antenna performance | n261 (28GHz) | 22.7 | -83.5 | 17.8 | -78.6 | 15.5 | / | 15.5 | / |
| | n260 (39GHz) | 23.8 | -83.1 | 17.9 | -77.2 | 15.8 | / | 15.8 | / |

FIG. 13

MOBILE TERMINAL

CROSS REFERENCE TO RELATED APPLICATIONS

This application claims the benefit of the Chinese Patent Application No. 202011132581.6, filed on Oct. 21, 2020, and entitled "MOBILE TERMINAL". The entire disclosures of the above application are incorporated herein by reference.

FIELD OF THE DISCLOSURE

The present application relates to the technical field of communications, and more particularly, to the technical field of terminal antenna structures, and in particular to a mobile terminal.

BACKGROUND

According to regulations of 3GPP, the global 5G standard-setting organization, NR mainly uses two frequency bands: FR1 frequency band and FR2 frequency band. The frequency range of the FR1 frequency band is 450 MHz-6 GHz, also known as sub-6G frequency band. The frequency range of the FR2 frequency band is 24.25 GHz to 52.6 GHz, also known as a millimeter-wave frequency band.

With the development of 5G technology, antennas in mobile terminals may carry more and more frequency bands. At present, 5G network has just started, especially the millimeter-wave communication network. There are very few complete devices compatible with sub-6G antenna and millimeter-wave antenna design on the market. How to design compatible sub-6 GHz antennas and millimeter-wave antennas has become an important research topic in the industry.

SUMMARY

Technical Problem

The embodiment of the present application provides a mobile terminal that is compatible with sub-6G antennas and millimeter-wave antennas, basically covers frequency bands of global operators, and improves antenna performance.

Technical Solution

An embodiment of the present application provides a mobile terminal, comprising: a casing, and a main board, an antenna bracket, a first antenna assembly, and a second antenna assembly disposed in the casing, wherein the first antenna assembly and the second antenna assembly are electrically connected to the main board; wherein the casing comprises a metal frame and a rear cover, and the metal frame is provided with a plurality of slots to divide the metal frame into a plurality of metal parts arranged at intervals; wherein the antenna bracket is provided with a plurality of wirings; wherein the first antenna assembly comprises a plurality of antenna structures, the plurality of antenna structures are formed based on the plurality of metal parts arranged at intervals and the plurality of wirings, and a working frequency band of the plurality of antenna structures is a sub-6G frequency band; and wherein the second antenna assembly comprises a plurality of millimeter-wave antenna modules, and a working frequency band of the plurality of millimeter-wave antenna modules is a millimeter-wave frequency band.

In some embodiments, the metal frame comprises a bottom frame, a top frame, a first side frame, and a second side frame, the bottom frame is provided with a first slot and a second slot, the first side frame is provided with a third slot, a fourth slot, and a fifth slot, and the second side frame is provided with a sixth slot, a seventh slot, and an eighth slot.

In some embodiments, the first antenna assembly comprises a first antenna structure, the first antenna structure comprises a first metal part, a first wiring, a first feed point, and a first ground point, the first metal part is located between the first slot and the third slot, a first end of the first metal part is coupled to the first ground point, a second end of the first metal part extends to the first slot, a first end of the first wiring is coupled to the second end of the first metal part, and the first feed point is located at a designated position of the first end of the first wiring; and wherein the first antenna structure is configured to form resonant frequencies of a mid-high frequency and a n79 frequency band.

In some embodiments, the first antenna assembly comprises a second antenna structure, the second antenna structure comprises a second metal part, a second wiring, and a second feed point, and a second ground point, the second metal part is located between the first slot and the second slot, a first end of the second metal part extends to the first slot, a second end of the second metal part extends to the second slot, a first end of the second wiring is coupled to the second end of the second metal part, and the second feed point is located at a designated position of the first end of the second wiring; and wherein the second antenna structure is configured to form resonance frequencies of an intermediate frequency and a n77 frequency band.

In some embodiments, the second antenna structure further comprises a first matching circuit, the first matching circuit comprises a first inductor and a first capacitor, the first inductor is connected in parallel at a position of the second feed point, and then the first capacitor is connected in series, and the first matching circuit is configured to cooperate with the second metal part to form the resonant frequency of the intermediate frequency.

In some embodiments, the first antenna assembly comprises a third antenna structure, the third antenna structure comprises a third metal part, a third wiring, a third feed point, and a second ground point, the third metal part is located between the second slot and the eighth slot, the first end of the third metal part extends to the second slot, a first end of the third metal part is coupled to the second ground point, a second end of the third metal piece extends to the second slot, a first end of the third wiring is connected to a designated position of the first end of the third metal part, and the third feed point is located at a designated position of the first end of the third wiring; and wherein the third antenna structure is configured to form resonance frequencies of a low frequency, a high frequency, a n77 frequency band, and a n79 frequency band.

In some embodiments, the third antenna structure further comprises a first switch, the first switch is coupled to the third metal part, and the first switch is configured to switch between different low frequency bands.

In some embodiments, the first antenna assembly comprises a fourth antenna structure, the fourth antenna structure comprises a fourth metal part, a fourth wiring, a fifth wiring, a sixth wiring, a seventh wiring, an eighth wiring, a fourth feed point, and a third ground point, the fourth metal part is located between the third slot and the fourth slot, a first end of the fourth metal part extends to the fourth slot and is coupled to the third ground point, a second end of the fourth metal part is coupled to the fourth feed point, a first end of the seventh wiring is respectively coupled to a second end of the fourth metal part and a first end of the fifth wiring, the sixth wiring and the eighth wiring are coupled to the seventh wiring, and a first end of the fourth wiring is coupled to a second end of the fifth wiring; and wherein the fourth antenna structure is configured to form resonance frequencies of a frequency band corresponding to a L5 band of GPS, a 2.4 GHz frequency band of Wi-Fi, and a 5 GHz frequency band of Wi-Fi.

In some embodiments, the fourth antenna structure further comprises a second matching circuit, the second matching circuit comprises a second inductor, the second inductance is connected in parallel at a position of the fourth feed point, and the second matching circuit is configured to increase resonance gains of the frequency band corresponding to the L5 band of GPS and the resonance frequency of the 2.4 GHz frequency band of Wi-Fi.

In some embodiments, the first antenna assembly comprises a fifth antenna structure and a fourth ground point, the metal part located between the fifth slot and the sixth slot is divided into a fifth metal part and a sixth metal part by a fourth ground point connected to the metal part; wherein the fifth antenna structure comprises the fifth metal part, a ninth wiring, and a fifth feed point, a first end of the fifth metal part is coupled to the fourth ground point, a second end of the fifth metal part extends to the fifth slot, a first end of the ninth wiring is coupled to the fifth metal part, and the fifth feed point is located at a designated position of a first end of the ninth wiring; and wherein the fifth antenna structure is configured to form resonant frequencies of a frequency band corresponding to a L1 band of GPS, a 2.4 GHz frequency band of Wi-Fi, and a 5 GHz frequency band of Wi-Fi.

In some embodiments, the fifth antenna structure further comprises a third matching circuit, the third matching circuit comprises a third inductor and a second capacitor, at a position of the fifth feed point, the second capacitor is connected in series, and then the third capacitor is connected in parallel, and the third matching circuit is configured to cooperate with the fifth metal part to form a resonant frequency of a frequency band corresponding to the L1 band of GPS.

In some embodiments, the first antenna assembly further comprises a sixth antenna structure, the sixth antenna structure comprises the sixth metal part, a tenth wiring, and a sixth feed point, the sixth metal part comprises a body part and a bent part, wherein a first end of the body part of the sixth metal part is coupled with the fourth ground point, a second end of the bent part of the sixth metal part extends to the sixth slot, a first end of the tenth wiring is coupled to the sixth metal part, and the sixth feed point is located at a designated position of the first end of the tenth wiring; and wherein the sixth antenna structure is configured to form resonance frequencies of a low frequency, a mid-high frequency, a n77 frequency band, and a n79 frequency band.

In some embodiments, the sixth antenna structure further comprises a fourth matching circuit, the fourth matching circuit comprises a third capacitor, the third capacitor is connected in series at a position of the sixth feed point, and the fourth matching circuit is configured to cooperate with the body part of the sixth metal part to form a low-frequency resonance frequency.

In some embodiments, the sixth antenna structure further comprises a second switch, the second switch is coupled to the body part of the sixth metal part, and the second switch is configured to switch different low frequency bands.

In some embodiments, the first antenna assembly comprises a seventh antenna structure, the seventh antenna structure comprises a seventh metal part, a seventh feed point, and a fifth ground point, the seventh metal part is located between the sixth slot and the seventh slot, a first end of the seventh metal part extends to the sixth slot and is coupled to the fifth ground point, and a second end of the seventh metal part extends to the seventh slot and is coupled with the seventh feed point; wherein the seventh antenna structure is configured to form resonant frequencies of a mid-high frequency, a frequency band n77, and a frequency band n79.

In some embodiments, the seventh antenna structure further comprises a fifth matching circuit, the fifth matching circuit comprises a fourth inductor and a fourth capacitor, at a position of the seventh feed point, the fourth capacitor is connected in series, and then the fourth inductor is connected in parallel, and the fifth matching circuit is configured to cooperate with the seventh metal part to form a resonant frequency of a low frequency.

In some embodiments, an avoidance angle between each of the millimeter-wave antenna modules in the second antenna assembly and the metal frame is greater than a signal scanning angle of each of the millimeter-wave antenna modules.

In some embodiments, the second antenna assembly comprises a first millimeter-wave antenna module, the first millimeter-wave antenna module is disposed adjacent to the top frame, the first millimeter-wave antenna module is electrically connected to the main board through a first connector, and a radiation direction of the first millimeter-wave antenna module is perpendicular to the rear cover.

In some embodiments, the second antenna assembly comprises a second millimeter-wave antenna module, the metal part between the fourth slot and the fifth slot on the first side frame is replaced by a first non-metal filler, the second millimeter-wave antenna module is disposed adjacent to the first non-metallic filler, the second millimeter-wave antenna module is electrically connected to the main board through a second connector and a first transmission line, and a radiation direction of the second millimeter-wave antenna module is perpendicular to the first non-metal filler.

In some embodiments, the second antenna assembly comprises a third millimeter-wave antenna module, the metal part between the seventh slot and the eighth slot on the second side frame is replaced by a second non-metal filling piece, the third millimeter-wave antenna module is disposed adjacent to the second non-metallic filler, the third millimeter-wave antenna module is electrically connected to the main board through a third connector and a second transmission line, and a radiation direction of the third millimeter-wave antenna module is perpendicular to the second non-metal filler.

Beneficial Effect

The mobile terminal provided by the embodiment of the present application includes a casing, and a main board, an antenna bracket, a first antenna assembly, and a second antenna assembly disposed in the casing, wherein the first antenna assembly and the second antenna assembly are electrically connected to the main board; wherein the casing comprises a metal frame and a rear cover, and the metal frame is provided with a plurality of slots to divide the metal frame into a plurality of metal parts arranged at intervals; wherein the antenna bracket is provided with a plurality of wirings; wherein the first antenna assembly comprises a plurality of antenna structures, the plurality of antenna structures are formed based on the plurality of metal parts arranged at intervals and the plurality of wirings, and a working frequency band of the plurality of antenna structures is a sub-6G frequency band; and wherein the second antenna assembly comprises a plurality of millimeter-wave antenna modules, and a working frequency band of the plurality of millimeter-wave antenna modules is a millimeter-wave frequency band. The embodiment of the present application can provide compatibility with sub-6G antennas and millimeter-wave antennas, basically covering frequency bands of global operators, and improving antenna performance.

BRIEF DESCRIPTION OF THE DRAWINGS

In order to more clearly illustrate the technical solutions in the embodiments of the present application, the following briefly introduces the drawings that need to be used in the description of the embodiments.

FIG. 13 is a chart of antenna performance test values of a first antenna assembly provided by an embodiment of the present application.

DETAILED DESCRIPTION

Figure 1:
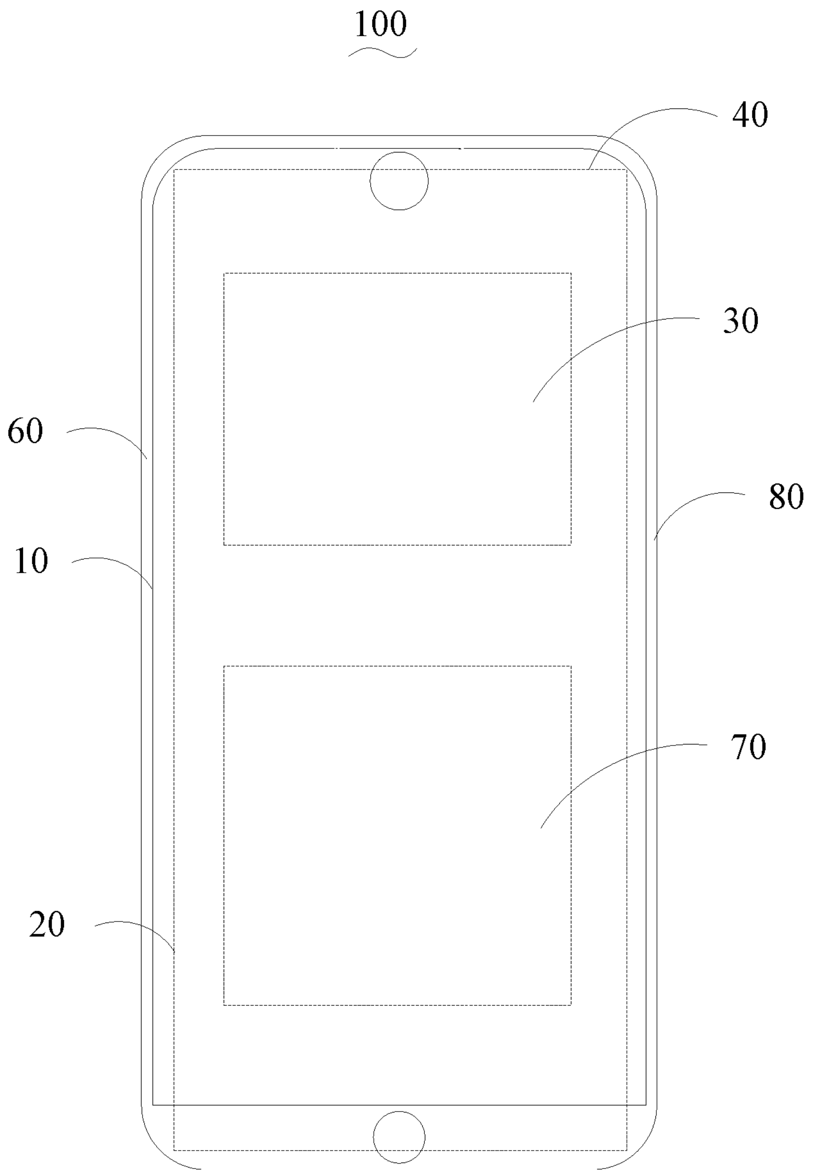
FIG. 1 is a schematic diagram of a first structure of a mobile terminal provided by an embodiment of the present application.
Figure 2:
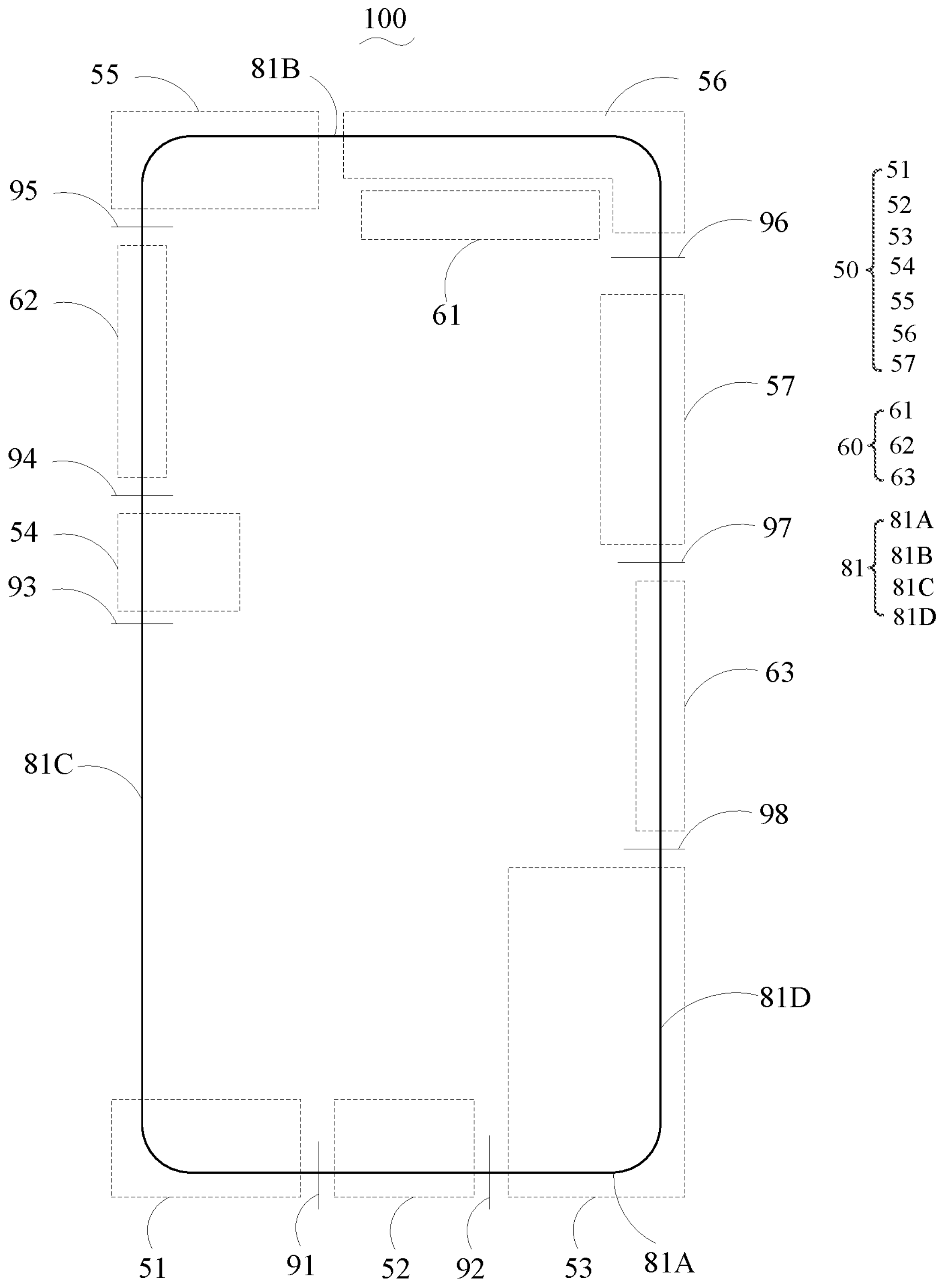
FIG. 2 is a schematic diagram of a second structure of a mobile terminal provided by an embodiment of the present application.
Figure 3:
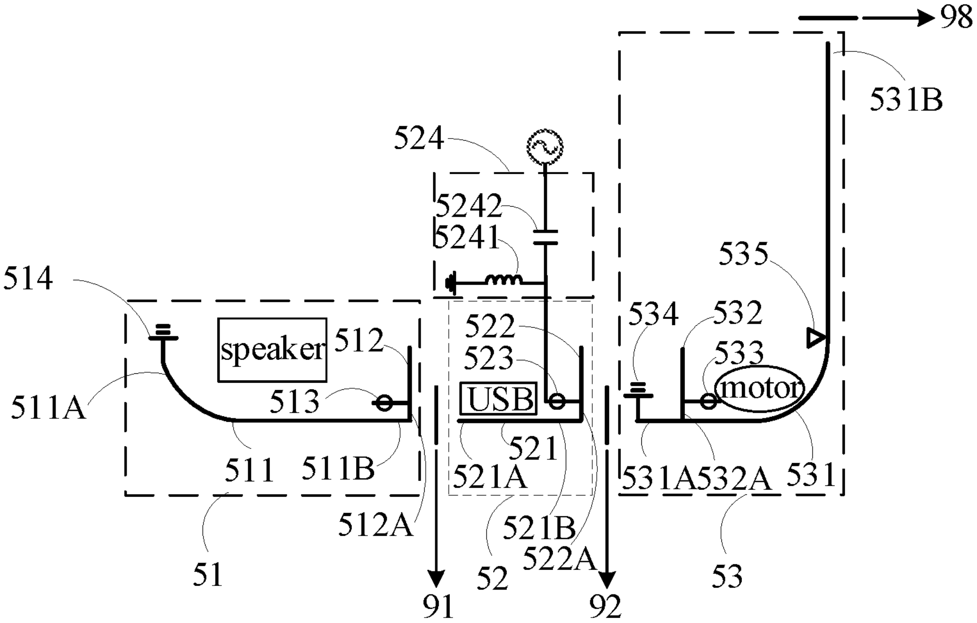
FIG. 3 is a schematic diagram of a first structure of a first antenna assembly provided by an embodiment of the present application.
Figure 4:
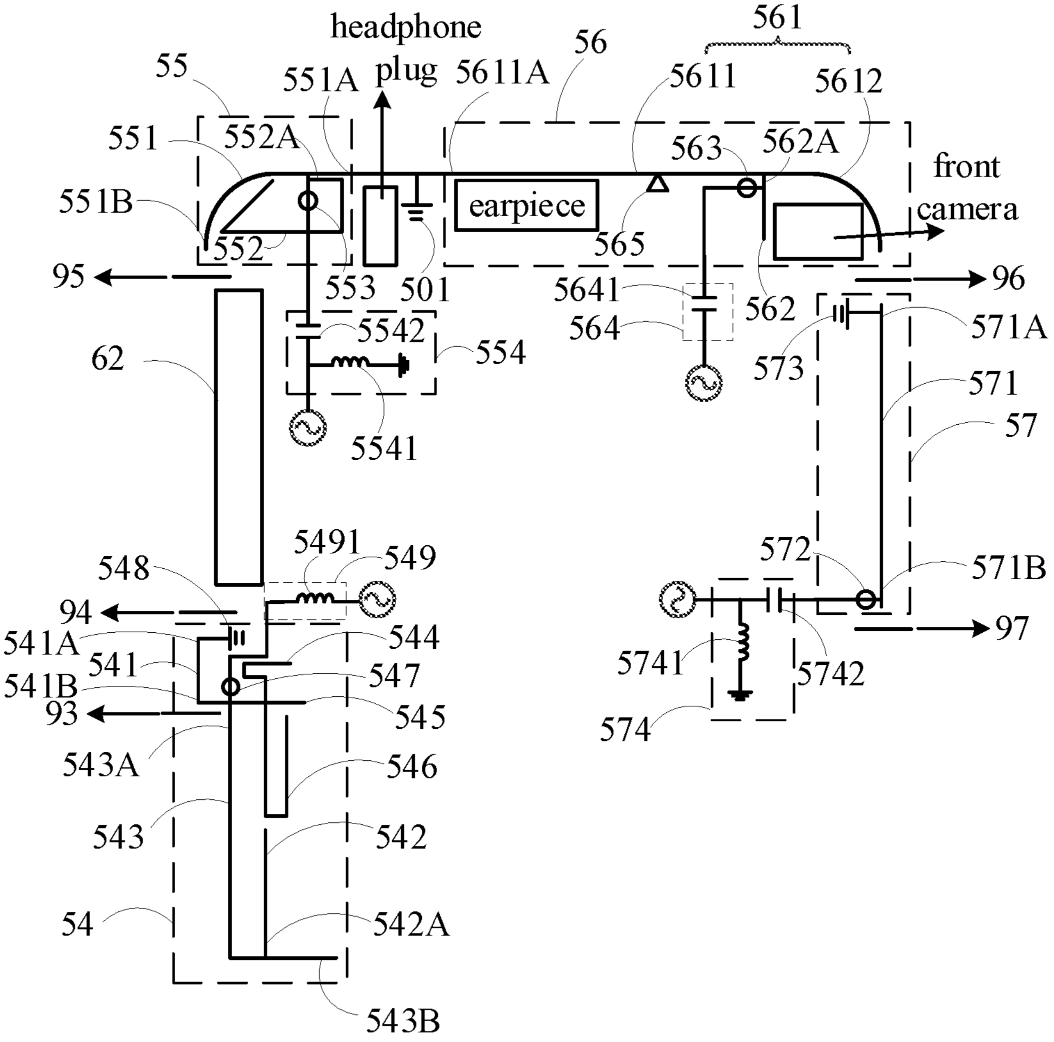
FIG. 4 is a schematic diagram of a second structure of a first antenna assembly provided by an embodiment of the present application.

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application.

An embodiment of the present application provides a mobile terminal. The mobile terminal may be a device such as a smart phone, a tablet computer, or a smart watch. Refer to FIG. 1 to FIG. 13, a mobile terminal 100 includes a cover plate 10, a display screen 20, a main board 30, an antenna bracket 40, a first antenna assembly 50, a second antenna assembly 60, a battery 70, and a casing 80.

The cover plate 10 is installed on the display screen 20 to cover the display screen The cover plate 10 may be a transparent glass cover plate. For example, the cover plate may be a glass cover plate made of a material such as sapphire.

The display screen 20 is mounted on a housing 80 to form a display surface of the mobile terminal 100. The display screen 20 may include a display area and a non-display area. The display area is used to display information such as images and texts. No information is displayed in the non-display area. The bottom of the non-display area can be provided with functional components such as a fingerprint module and a touch circuit.

For example, the display screen 20 can also be a full screen with only a display area and no non-display area. Functional components such as fingerprint module and touch circuit are arranged under the full screen. For example, the display screen 20 may also be a special-shaped screen. The main board 30 is installed in the closed space formed by the cover plate 10 and the casing 80. One, two, or more of functional components such as a motor, a microphone, a loudspeaker, a headphone jack, a universal serial bus interface, a front camera, a rear camera, a distance sensor, an ambient light sensor, a receiver, and a processor may be integrated on the main board 30. The antenna bracket 40, the first antenna assembly 50, and the second antenna assembly 60 are installed in a closed space formed by the cover plate 10 and the casing 80. The antenna bracket 40 has a laser engraving area. Laser engraving technology can be used to engrave lines on the laser engraving area, for example, the lines can be radium engraving lines. The first antenna assembly 50 and the second antenna assembly 60 are electrically connected to the main board 30.

The battery 70 is installed in the closed space formed by the cover plate 10 and the casing 80. The battery 70 is electrically connected to the main board 30 to provide power to the mobile terminal 100.

The casing 80 includes a metal frame 81 and a rear cover 82. The cover plate 10 can be fixed on the metal frame 81. The cover plate 10, the metal frame 81, and the rear cover 82 form a closed space for accommodating components such as the display screen 20, the main board 30, the antenna bracket 40, the first antenna assembly 50, the second antenna assembly 60, and the battery 70. The cover plate 10 covers the metal frame 81 from the front of the mobile terminal 100. The back cover 82 is covered on the metal frame 81 from the back of the mobile terminal 100, and the cover plate 10 and the rear cover 82 are arranged opposite to each other.

For example, the rear cover 82 can be a plastic shell. For example, the rear cover 82 can also be a ceramic shell. For example, the rear cover 82 can also be a shell structure in which metal and plastic cooperate with each other.

The rear cover 82 may serve as a battery cover for the battery 70. The rear cover 82 covers the battery 70 to protect the battery 70. Specifically, the rear cover 82 covers the battery 70 to protect the battery 70 and reduce damage to the battery 70 due to collisions or drops of the mobile terminal 100.

Specifically, several slots 90 are opened on the metal frame 81 to divide the metal frame 81 into a plurality of metal parts arranged at intervals. Multiple wires are arranged on the antenna bracket 40. The first antenna assembly 50 includes a plurality of antenna structures. The plurality of antenna structures are formed based on a plurality of metal parts arranged at intervals and a plurality of wiring. The working frequency band of multiple antenna structures is the Sub-6G frequency band. The second antenna assembly 60 includes a plurality of millimeter-wave antenna modules. The working frequency band of the multiple millimeter-wave antenna modules is a millimeter wave frequency band.

In some embodiments, the metal frame 81 includes a bottom frame 81A, a top frame 81B, a first side frame 81C, and a second side frame 81D. A first slot 91 and a second slot 92 are defined on the bottom frame 81E.A third slot 93, a fourth slot 94, and a fifth slot 95 are formed on the first side frame 81C. A sixth slot 96, a seventh slot 97, and an eighth slot 98 are formed on the second side frame 81D.

In some embodiments, the first antenna assembly 50 includes a first antenna structure 51. The first antenna structure 51 includes a first metal part 511, a first wiring 512, a first feed point 513, and a first ground point 514. The first metal part 511 is located between the first slot 91 and the third slot 93. A first end 511A of the first metal part 511 is coupled to the first ground point 514. A second end 511B of the first metal part 511 extends to the first slot 91. The first end 512A of the first wiring 512 is coupled to the second end 511A of the first metal part 511. The first feed point 513 is located at a designated position of the first end 512A of the first wiring 512. The first antenna structure 51 is used to form resonant frequencies of a mid-high frequency and a n79 frequency band.

For example, the first metal part 511 and the first wiring 512 are used to form a resonant frequency of a mid-high frequency in the form of a loop antenna. The first wiring 512 is used to couple with the first ground point 514 through the first metal part 511 to form a resonant frequency of a n79 frequency band.

For example, the function of the first antenna structure 51 is a mid-high frequency main set antenna and an n79 MIMO antenna. The first metal part 511 is a part of the metal frame 81. A second end 511B of the first metal part 511 is close to the slotted position. A first end 511A of the first metal part 511 is grounded through the first ground point 514, and a loop antenna is used to generate mid-high frequency resonance. The first wiring 512 is a laser engraving wiring connected to the first feed point 513 on the antenna bracket 40. The n79 resonance is generated by coupling with the first ground point 514. The first antenna structure 51 does not use a matching circuit. Regarding the free space efficiency of the first antenna structure 51, the mid-high frequency main set antenna is −7.3 dB, and the n79 MIMO antenna is −7.5 dB.

In some embodiments, the first antenna assembly 50 includes a second antenna structure 52. The second antenna structure 52 includes a second metal part 521, a second wiring 522, and a second feed point 523. The second metal part 521 is located between the first slot 91 and the second slot 92. The first end 521A of the second metal part 521 extends to the first slot 91. The second end 521B of the second metal part 521 extends to the second slot 92. The first end 522A of the second wiring 522 is coupled to the second end 521B of the second metal part 521. The second feed point 523 is located at a designated position of the first end 522A of the second wiring 522. The second antenna structure 52 is used to form the resonant frequencies of the intermediate frequency and the n77 frequency band.

For example, the second metal part 521 is used to form the resonant frequency of the intermediate frequency in the form of a monopole antenna, and the second wiring 522 is used to form the resonant frequency of the n77 frequency band.

In some embodiments, the second antenna structure 52 also includes a first matching circuit 524. The first matching circuit 524 includes a first inductor 5241 and a first capacitor 5242. At the position of the second feed point 523, the first inductor 5241 is connected in parallel, and then the first capacitor 5242 is connected in series. The first matching circuit 523 is used to cooperate with the second metal part 521 to form a resonant frequency of the intermediate frequency. A first end of the first inductor 5241 is connected to the second feed point 523, and a second end of the first inductor 5241 is grounded. The first end of the first capacitor 5242 is connected to the second feed point 523 and the first end of the first inductor 5241. The second end of the first capacitor 5242 is connected to a signal source, and the signal source can be set on the main board 30.

For example, the second antenna structure 52 functions as an intermediate frequency MIMO antenna and n77 main set antenna. The second metal part 521 is a part of the metal frame 81. Both ends of the second metal part 521 are respectively close to the slot. Resonance occurs at intermediate frequencies in the form of a monopole antenna. The second wiring 522 is a radium engraved wiring connected to the second feed point 523 on the antenna bracket 40 and resonates at n77. The first matching circuit 524 starts from the second feed point 523 and connects the first inductor 5241 of 3.6 nH firstly, and then connects the second capacitor 5242 of 0.75 pF in series. The function of the first matching circuit 524 is to cooperate with the second metal part 521 to generate resonance at an intermediate frequency in the form of a monopole antenna. The free space efficiency of the second antenna structure 52 is −8.7 dB for the IF MIMO antenna and −7.4 dB for the n77 main set antenna.

In some embodiments, the first antenna assembly 50 includes a third antenna structure 53. The third antenna structure 53 includes a third metal part 531, a third wiring 532, a third feed point 533, and a second ground point 534. The third metal part 531 is located between the second slot 92 and the eighth slot 98. The first end 531A of the third metal part 531 extends to the second slot 92, and the first end 531A of the third metal part 531 is coupled to the second ground point 534. The second end 531B of the third metal part 531 extends to the second slot 92. The first end 532A of the third wiring 532 is connected to a designated position of the first end 531A of the third metal part 531. The third feed point 533 is located at a designated position of the first end 532A of the third wiring 532. The third antenna structure 53 is used to form resonance frequencies of low frequency, high frequency, n77 frequency band and n79 frequency band.

For example, the third metal part 531 and the third wiring 532 are used to form low-frequency and high-frequency resonant frequencies in the form of an inverted-F antenna. The third wiring 532 is used to couple with the second ground point 534 through the third metal part 531 to form the resonant frequency of the frequency band n77 and the frequency band n79.

In some embodiments, the third antenna structure 53 further includes a first switch 535. The first switch 535 is coupled to the third metal part 531. The first switch 535 is used for switching different low frequency bands.

For example, the functions of the third antenna structure 53 are low frequency diversity antenna, high frequency MIMO antenna, n77 diversity antenna, and n79 diversity antenna. The third metal part 531 is a part of the metal frame 81. Both ends of the third metal part 531 are respectively close to the slot, and resonate at low frequency and high frequency in the form of an IFA antenna (Inverted F Antenna, inverted F-shaped antenna). The third trace 532 is a radium engraved wiring connected to the third feed point 533 on the antenna bracket 40, and is coupled with the second ground point 534 to generate resonance on n77 and n79. The third antenna structure 53 does not use a matching circuit. The third antenna structure 53 also uses the first switch 535 to switch between different low-frequency bands by connecting different inductances in parallel to the ground, so as to achieve full coverage of 699-960 MHz. Taking the mobile phone terminal held by the user as an example, the distance from the end of the third antenna structure 53 to the bottom of the mobile phone is 45 mm. The end of the third antenna structure 53 is between the ring finger and the little finger in the hand model, that is, the end is not blocked by the finger, which is beneficial to improve the low-frequency signal radiation capability. For the free space efficiency of the third antenna structure 53, the peak value of the low frequency diversity antenna is −7 dB. The HF MIMO antenna is −9.3 dB, the n77 diversity antenna is −8.1 dB, and the n79 diversity antenna is −6.4 dB.

For example, take a full-screen 5G mobile phone as an example. In order to deploy the bottom sub-6G antenna, the bottom clearance of the full-screen 5G mobile phone is set to 1.5 mm. Three slots are opened, and three antennas are deployed: a first antenna structure 51, a second antenna structure 52, and a third antenna structure 53. The isolation between antennas is an important performance index of the antenna. The better the isolation between the antennas, the smaller the mutual interference between the antennas.

For example, through experimental testing, the isolation between the antennas of the first antenna structure 51 and the second antenna structure 52 is at worst −12 dB. The isolation between the antennas of the first antenna structure 51 and the third antenna structure 53 is −16 dB at worst. The isolation between the antennas of the second antenna structure 52 and the third antenna structure 53 is −10 dB at worst. Therefore, when the isolation between the three antennas below the mobile phone is −10 dB at worst, the isolation performance of the three antennas is good.

In some embodiments, the first antenna assembly 50 includes a fourth antenna structure 54. The fourth antenna structure 54 includes a fourth metal part 541, a fourth wiring 542, a fifth wiring 543, a sixth wiring 544, a seventh wiring 545, an eighth wiring 546, a fourth feed point 547, and a third ground point 548. The fourth metal part 541 is located between the third slot 93 and the fourth slot 94. The first end 541A of the fourth metal part 541 extends to the fourth slot 94 and is coupled to the third ground point 548. The second end 541B of the fourth metal part 541 is coupled to the fourth feed point 547. The first end 545A of the seventh wiring 545 is respectively coupled to the second end 541B of the fourth metal part 541 and the first end 543A of the fifth wire 543. The sixth wiring 544 and the eighth wiring 546 are coupled to the seventh wiring 545. The first end 542A of the fourth wiring 542 is coupled to the second end 543B of the fifth wiring 543. The fourth antenna structure 54 is used to form resonance frequencies of the frequency band corresponding to the L5 band of GPS, the 2.4 GHz frequency band of Wi-Fi, and the 5 GHz frequency band of Wi-Fi.

For example, the fourth metal part 541, the fourth wiring 542 and the fifth wiring 543 are used to form a resonant frequency of a frequency band corresponding to the L5 band of GPS in the form of an inverted-F antenna. The fourth metal part 541, the sixth wiring 544, the seventh wiring 545, and the eighth wiring 546 are used to form the resonant frequencies of the 2.4 GHz frequency band and the 5 GHz frequency band of Wi-Fi in the form of an inverted-F antenna.

In some embodiments, the fourth antenna structure 54 also includes a second matching circuit 549. The second matching circuit 549 includes a second inductor 5491. A second inductor 5491 is connected in parallel at the fourth feed point 547. The second matching circuit 549 is used to increase the resonance gain of the frequency band corresponding to the L5 band of GPS and the resonance frequency of the 2.4 GHz frequency band of Wi-Fi. A first end of the second inductor 5491 is connected to the fourth feed point 547. The second end of the second inductor 5491 is connected to a signal source, and the signal source can be set on the main board 30.

The fourth antenna structure 54 integrates the GPS L5 antenna, the second Wi-Fi 2.4G antenna, and the second Wi-Fi 5G antenna. The form of the fourth antenna structure 54 is relatively complicated, and generally can be regarded as an IFA antenna. The fourth metal part 541 is a part of the metal frame 81. Two ends of the fourth metal part 541 are respectively close to the slot, one end of which is connected to the third ground point 548, and the other end is connected to the fourth feed point 547. The fourth wiring 542 and the fifth wiring 543 are laser engraved wirings connected to the fourth feed point 547 on the antenna bracket 40. The antenna is in the form of an IFA antenna, which resonates at GPS L5 (1176 MHz). The sixth wiring 544, the seventh wiring 545, and the eighth wiring 546 are radium engraved wirings connected to the fourth feed point 547 on the antenna bracket 40. The antenna is in the form of an IFA antenna, which resonates at Wi-Fi 2.4G. The fourth antenna structure 54 also resonates at Wi-Fi 5G. The second matching circuit 549 is a second inductance 5491 of 3.6 nH starting from the fourth feed point 547. The function of the second matching circuit 549 is to deepen the resonance at 1176 MHz and 2450 MHz. That is to increase the resonance gain of the frequency band corresponding to the L5 band of GPS and the resonant frequency of the 2.4 GHz frequency band of Wi-Fi. For the free space efficiency of the fourth antenna structure 54, the GPS L5 antenna is −5.8 dB, the Wi-Fi 2.4G second antenna is −6.5 dB, and the Wi-Fi 5G second antenna is −6.8 dB.

In some embodiments, the first antenna assembly 50 includes a fifth antenna structure 55 and a fourth ground point 501. The metal part located between the fifth slot 95 and the sixth slot 96 is divided into a fifth metal part 551 and a sixth metal part 561 by the fourth ground point 501 connected to the metal part. The fifth antenna structure 55 includes a fifth metal part 551, a ninth wiring 552, and a fifth feed point 553. The first end 551A of the fifth metal part 551 is coupled to the fourth ground point 501. The second end 551B of the fifth metal part 551 extends to the fifth slot 95. The first end 552A of the ninth wiring 552 is coupled to the fifth metal part 551. The fifth feed point 553 is located at a designated position of the first end 552A of the ninth wiring 552. The fifth antenna structure 55 is used to form the resonant frequency of the frequency band corresponding to the L1 band of GPS, the 2.4 GHz frequency band of Wi-Fi, and the 5 GHz frequency band of Wi-Fi.

For example, the fifth metal part 551 and the ninth wiring 552 are used to form a resonant frequency of a frequency band corresponding to the L1 band of GPS in the form of an inverted-F antenna. The fifth metal part 551 and the ninth wiring 552 are used to form the resonant frequencies of the 2.4 GHz frequency band and the 5 GHz frequency band of Wi-Fi in the form of an inverted-F antenna.

In some embodiments, the fifth antenna structure 55 also includes a third matching circuit 554. The third matching circuit 554 includes a third inductor 5541 and a second capacitor 5542. At the position of the fifth feed point 553, the second capacitor 5542 is connected in series, and then the third inductor 5541 is connected in parallel. The third matching circuit 554 is used to cooperate with the fifth metal part 551 to form a resonant frequency of a frequency band corresponding to the L1 band of the GPS. A first end of the second capacitor 5542 is connected to the fifth feed point 553. The second end of the second capacitor 5542 is connected to the signal source, and the first end of the third inductor 5541 is incorporated between the second end of the second capacitor 5542 and the signal source. The second end of the third inductor 5541 is grounded.

For example, the fifth antenna structure 55 integrates the GPS L1 antenna, the first Wi-Fi 2.4G antenna, and the first Wi-Fi 5G antenna. The fifth metal part 551 is a part of the metal frame 81. The end of the fifth metal part 551 is close to the slot, and the antenna is in the form of an IFA antenna, which resonates at GPS L1 (1575 MHz). The ninth wiring 552 is a radium-carved wiring connected to the fifth feed point 553 on the antenna bracket 40, and the antenna is also an IFA antenna, which resonates at Wi-Fi 2.4G. The fifth antenna structure 55 also resonates at Wi-Fi 5G. The third matching circuit 554 is, starting from the fifth feed point 553, a 3.9 pF capacitor is connected in series, and then a 3.9 nH inductor is connected in series. The function of the third matching circuit 554 is to cooperate with the fifth metal part 551 to generate resonance at the GPS L1. For the free space efficiency of the fifth antenna structure 55, the GPS L1 antenna is −6 dB, the Wi-Fi 2.4 G first antenna is −7.4 dB, and the Wi-Fi 5G first antenna is −5.3 dB.

In some embodiments, the first antenna assembly 50 also includes a sixth antenna structure 56. The sixth antenna structure 56 includes a sixth metal part 561, a tenth wiring 562, and a sixth feed point 563. The sixth metal part 561 includes a body part 5611 and a bent part 5612. The first end 5611A of the body part 5611 of the sixth metal part 561 is coupled to the fourth ground point 501. The second end 5612B of the bent part 5612 of the sixth metal part 561 extends to the sixth slot 96. The first end 562A of the tenth wiring 562 is coupled to the sixth metal part 561. The sixth feed point 563 is located at a designated position of the first end 562A of the tenth wiring 562. The second end 5611B of the body part 5611 is connected to the first end 5612A of the bent part 5612. The sixth antenna structure 56 is used to form resonance frequencies of a low frequency, a mid-high frequency, a n77 frequency band, and a n79 frequency band.

For example, the body part 5611 of the sixth metal part 561 is used to form a low-frequency resonance frequency in the form of a loop antenna. The bent part 5612 of the sixth metal part 561 is used to form a mid-high frequency resonant frequency in the form of a loop antenna. The tenth wiring 562 is used to form the resonant frequencies of the frequency band n77 and the frequency band n79 through coupling with the fourth ground point 501.

In some embodiments, the sixth antenna structure 56 also includes a fourth matching circuit 564. The fourth matching circuit 564 includes a third capacitor 5641. The third capacitor 5641 is connected in series at the position of the sixth feed point 563. The fourth matching circuit 564 is used to cooperate with the body part 5611 of the sixth metal part 561 to form a low frequency resonant frequency. A first end of the third capacitor 5641 is connected to the sixth feed point 563. The second end of the third capacitor 5641 is connected to the signal source. The signal source can be set on the main board 30.

In some embodiments, the sixth antenna structure 56 further includes a second switch 565. The second switch 465 is coupled to the body part 5611 of the sixth metal part 561. The second switch 565 is used for switching different low frequency bands.

For example, the function of the sixth antenna structure 56 is a low-frequency main antenna, a mid-high frequency diversity antenna, an n77 MIMO antenna, and an n79 MIMO antenna. The main body 5611 is a part of the metal frame 81, and the antenna is in the form of a Loop antenna, which resonates at a low frequency. The bent part 5612 is a part of the metal frame 81, and the end is close to the slot. A section of the bent part 5612 is extended from the Loop antenna of the main body part 5611 to generate resonance at the mid-high frequency. The tenth wiring 562 is a radium carving wiring connected to the sixth feed point 563 on the antenna bracket 40 and generates resonance at n77 and n79 by coupling with the fourth ground point 501. The fourth matching circuit 464 is, starting from the sixth feed point 563, a third capacitor 5641 of 1 pF connected in series, and the function of the fourth matching circuit 464 is to generate resonance at a low frequency. The sixth antenna structure 56 uses the second switch 565 to switch between different low-frequency bands by connecting different inductances in parallel to the ground, so as to achieve full coverage of 699-960 MHz. For the free space efficiency of the sixth antenna structure 56, the peak value of the low frequency main set antenna is −5.5 dB. The mid-high frequency diversity antenna is −8.6 dB, the n77 MIMO antenna is −8 dB, and the n79 MIMO antenna is −4.2 dB.

In some embodiments, the first antenna assembly 50 includes a seventh antenna structure 57. The seventh antenna structure 57 includes a seventh metal part 571, a seventh feed point 572, and a fifth ground point 573. The seventh metal part 571 is located between the sixth slot 96 and the seventh slot 97. The first end 571A of the seventh metal part 571 extends to the sixth slot 96 and is coupled to the fifth ground point 573. The second end 571B of the seventh metal part 571 extends to the seventh slot 97 and is coupled to the seventh feed point 572. The seventh antenna structure 57 is used to form the resonant frequency of mid-high frequency, frequency band n77, and frequency band n79.

In some embodiments, the seventh antenna structure 57 also includes a fifth matching circuit 574. The fifth matching circuit 574 includes a fourth inductor 5741 and a fourth capacitor 5742. At the position of the seventh feed point 572, the fourth capacitor 5742 is connected in series, and then the fourth inductor 5741 is connected in parallel. The fifth matching circuit 574 is used to cooperate with the seventh metal part 571 to form a low frequency resonance frequency.

For example, the functions of the seventh antenna structure 57 are mid-high frequency MIMO antennas, n77 MIMO antennas, and n79 main set antennas. The seventh metal part 571 is a part of the metal frame 81. Both ends of the seventh metal part 571 are close to the slot, and the antenna is in the form of a Loop antenna. The seventh antenna structure 57 may resonate at n77 and n79. The fifth matching circuit 574 is, starting from the seventh feed point 572, a fourth capacitor 5742 of 0.75 pF is connected in series, and a fourth inductor 5741 of 3.6 nH is connected in series. The function of the fifth matching circuit 574 is to generate resonance at mid-high frequency. For the free space efficiency of the seventh antenna structure 57, the mid-high frequency MIMO antenna is −8 dB. The n77 MIMO antenna is −9.6 dB, and the n79 main set antenna is −5.7 dB.

For example, take a full-screen 5G mobile phone as an example. In order to deploy the top sub-6G antenna, the top clearance of the full-screen 5G mobile phone is 1.5 mm. Four slots are also opened, and four antennas are deployed: the fourth antenna structure 54, the fifth antenna structure 55, the sixth antenna structure 56, and the seventh antenna structure 57.

For example, through experimental testing, the isolation between the antennas of the fourth antenna structure 54 and the fifth antenna structure 55 is at worst −14 dB. The isolation between the antennas of the fourth antenna structure 54 and the sixth antenna structure 56 is at worst −24 dB. The isolation between the antennas of the fourth antenna structure 54 and the seventh antenna structure 57 is −23 dB at worst. The isolation between the antennas of the fifth antenna structure 55 and the sixth antenna structure 56 is −20 dB at worst. The isolation between the antennas of the fifth antenna structure 55 and the seventh antenna structure 57 is −23 dB at worst. The isolation between the antennas of the sixth antenna structure 56 and the seventh antenna structure 57 is −15 dB at worst. Therefore, the worst isolation between the four antennas above the mobile phone is −14 dB, and the isolation performance of the four antennas is better.

Figures 5, 6:
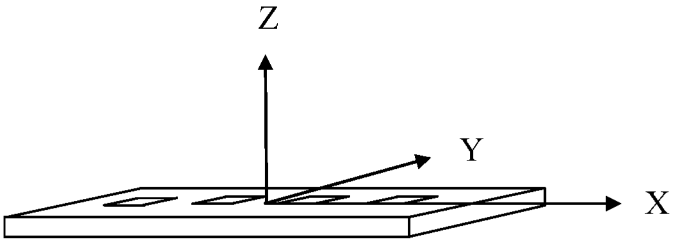
FIG. 5 is a chart of free space efficiency values of a first antenna assembly provided by an embodiment of the present application.
FIG. 6 is a schematic structural diagram of a millimeter-wave antenna module provided by an embodiment of the present application.

Refer to FIG. 5, which shows the free space efficiency value of the whole Sub-6G antenna. It can be seen from the figure that the performance of low frequency 2×2 MIMO is better. The performance of the main set antenna in the medium and high frequency still needs to be optimized, but the overall performance of 4×4 MIMO is better. The average efficiency of the n77 and n79 4×4 MIMO is −7.1 dB. The performance is better at such a large bandwidth, and the performance of Wi-Fi and GPS is better.

In some embodiments, the avoidance angle between each millimeter-wave antenna module in the second antenna assembly 60 and the metal frame 81 is greater than the signal scanning angle of each millimeter-wave antenna module.

Only when the avoidance angle is greater than the signal scanning angle, metal devices such as the metal frame in the mobile terminal 100 will not affect the signal radiation of the millimeter-wave antenna module.

The millimeter-wave frequency is high, and the wavelength is short, and the signal attenuation is large. In order to ensure the transmission effect, the antennas are all in the form of an array. Although the array antenna greatly improves the antenna gain, the signal beam is narrow, the coverage angle is small, and the directionality is extremely strong. Due to the uncertainty of network signal access angle, in order to prevent end users from losing signals at certain angles, multiple millimeter-wave antenna modules need to be placed in different positions in the whole machine.

Figure 7:
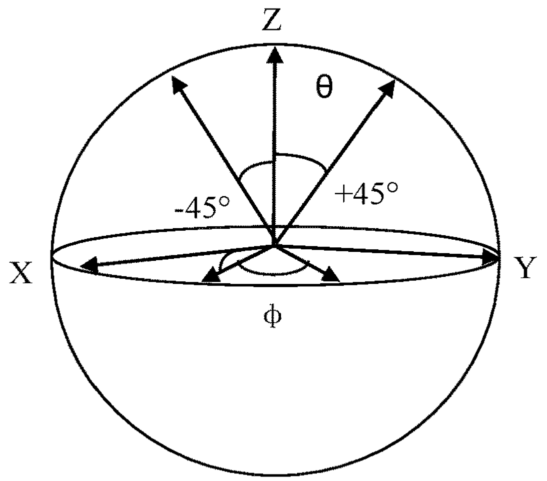
FIG. 7 is a schematic diagram of signal scanning angles of a millimeter-wave antenna module provided by the embodiment of the present application.

The millimeter-wave antenna module used in the embodiment of the present application can support 2×2 MIMO function, including array antenna, amplitude and phase control unit, power control, power management and frequency conversion circuit. The array antenna is a 1×4 linear array antenna, which is composed of 4 patch units, as shown in FIG. 6. X, Y, and Z all indicate the direction of signal radiation. Supported signal scan angles (θ or φ) are 0 to ±45°, as shown in FIG. 7. The avoidance angle between each millimeter-wave antenna module in the second antenna assembly 60 and the metal frame 81 is greater than 60°.

In some embodiments, the second antenna assembly 60 includes a first millimeter-wave antenna module 61. The first millimeter-wave antenna module 61 is disposed adjacent to the top frame 81B. The first millimeter-wave antenna module 61 is electrically connected to the main board 30 through the first connector 31. The radiation direction of the first millimeter-wave antenna module 61 is perpendicular to the rear cover 82.

Figure 8:
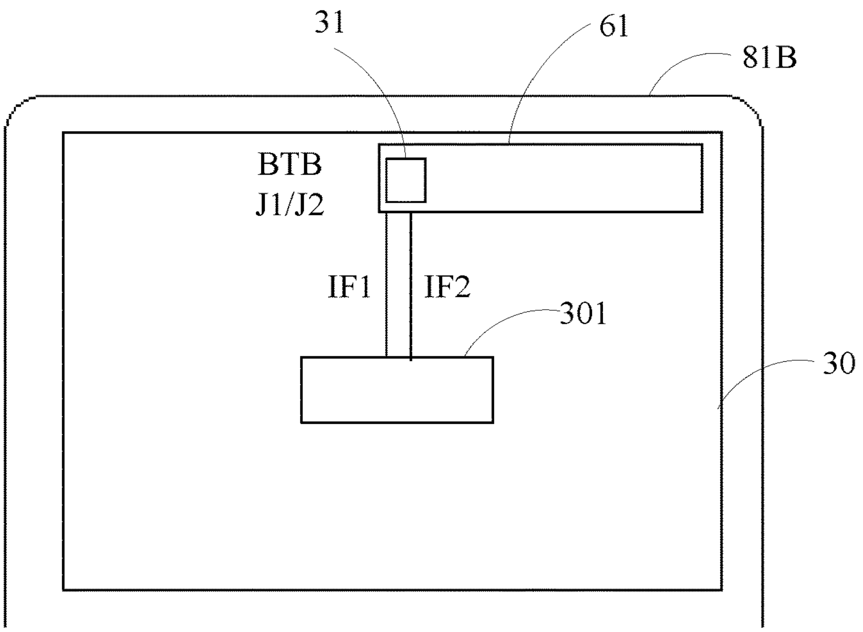
FIG. 8 is a schematic diagram of a first structure of a second antenna assembly provided by an embodiment of the present application.
Figure 9:
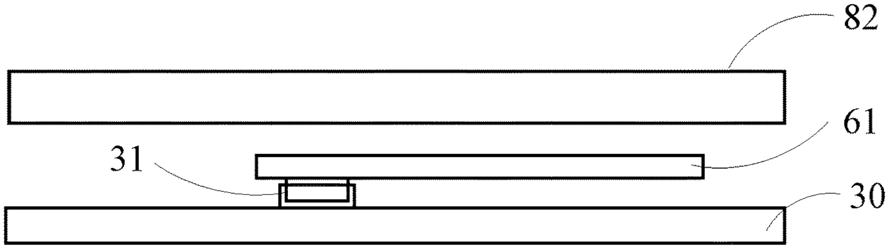
FIG. 9 is a second structural schematic diagram of a second antenna assembly provided by an embodiment of the present application.

As shown in FIG. 8 and FIG. 9, deploy the top mmWave antenna. Specifically, the first millimeter-wave antenna module 61 placed on the main board 10 is arranged on the top of the mobile terminal 100. The radiation direction is perpendicular to the rear cover 82. Considering the millimeter-wave frequency band, the wavelength of the electromagnetic wave is short, and the dielectric constant of the medium has a great influence on the electromagnetic wave. The thickness of the rear cover 82 in the embodiment of the present application is 0.6 mm, and the distance between the battery 70 and the first millimeter-wave antenna module 61 is 0.5 mm. The avoidance angle between the first millimeter wave antenna module 61 and surrounding metal components such as a metal frame is 60° or above. That is, the angle between the edge of the first millimeter-wave antenna module 61 and any metal device needs to be greater than or equal to 60°. The metal devices that need to be avoided also include the traditional antenna wirings below 6 GHz on the top. That is, the avoidance angle between the first millimeter-wave antenna module 61 and any antenna structure in the top sub-6G antenna needs to be greater than or equal to 60°. This environmental design method does not affect the performance of the antenna below 6 GHz, and also ensures the performance of the millimeter-wave antenna.

For example, the first connector 31 may adopt an IPEX BTB connector. The first millimeter-wave antenna module 61 connects two channels of intermediate frequency signals (8.5 GHz) to the radio frequency chip 301 on the main board 30 through the J1 interface and the J2 interface of the IPEX BTB connector. The J1 patch is on the first millimeter-wave antenna module 61, and the J2 patch is on the main board 30. As shown in FIG. 8, IF1 represents the first intermediate frequency signal, and IF2 represents the second intermediate frequency signal. For example, the first millimeter-wave antenna module 61 deployed on the top can be placed horizontally and horizontally, or can be placed horizontally and vertically on the main board of the mobile terminal. The performance of the millimeter-wave antenna corresponding to the two placement methods is the same.

In some embodiments, the second antenna assembly 60 further includes a second millimeter-wave antenna module 62. The metal part between the fourth slot 94 and the fifth slot 95 on the first side frame 81C is replaced by a first non-metal filling part 8101. The second millimeter-wave antenna module 62 is disposed adjacent to the first non-metal filler 8101. The second millimeter-wave antenna module 62 is electrically connected to the main board 30 through the second connector 32 and the first transmission line 33. The radiation direction of the second millimeter-wave antenna module 62 is perpendicular to the first non-metal filler 8101.

In some embodiments, the second antenna assembly 60 further includes a third millimeter-wave antenna module 63. The metal part between the seventh slot 97 and the eighth slot 98 on the second side frame 81D is replaced by a second non-metal filling part 8102. The third millimeter-wave antenna module 63 is disposed adjacent to the second non-metal filler 8102. The third millimeter-wave antenna module 63 is electrically connected to the main board through the third connector 34 and the second transmission line 35. The radiation direction of the third millimeter-wave antenna module 63 is perpendicular to the second non-metal filler 8102.

For example, only relying on the first millimeter-wave antenna module 61 at the top, the signal coverage angle is too narrow. Therefore, two modules can also be placed vertically and vertically on both sides of the mobile terminal 100. The second millimeter-wave antenna module 62 and the third millimeter-wave antenna module 63 can increase the signal coverage angle more effectively.

Figure 10:
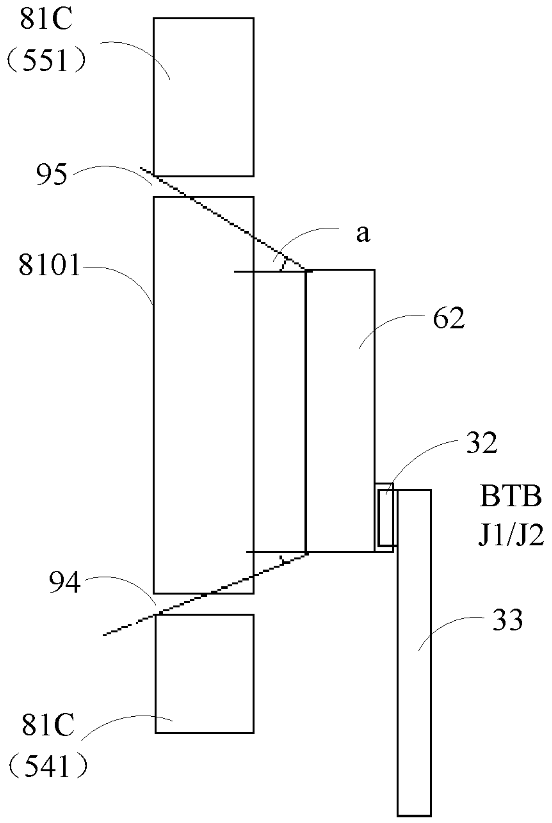
FIG. 10 is a schematic diagram of a third structure of a second antenna assembly provided by an embodiment of the present application.
Figure 11:
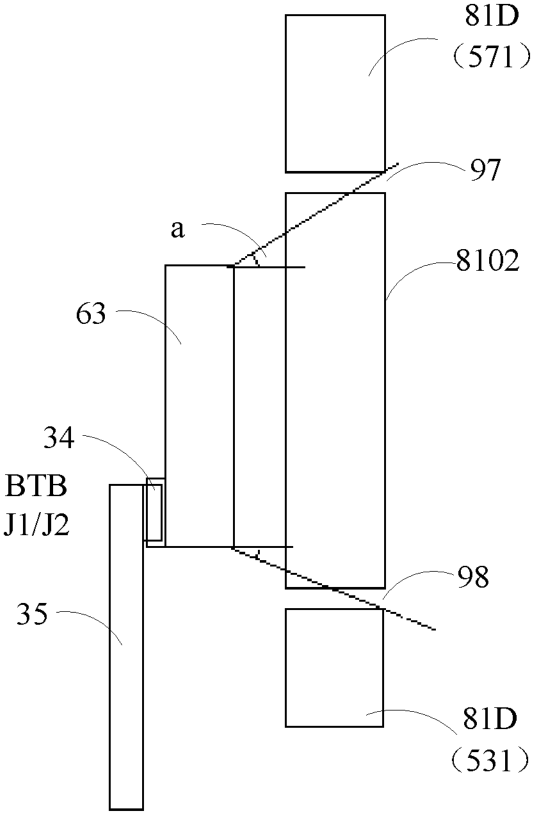
FIG. 11 is a schematic diagram of a fourth structure of a second antenna assembly provided by an embodiment of the present application.

As shown in FIG. 10 and FIG. 11, the radiation surfaces of the second millimeter-wave antenna module 62 and the third millimeter-wave antenna module 63 face the side plastic shell of the mobile terminal 100 (i.e., the first non-metallic filler 8101 and the second non-metallic filler 8102). The avoidance angle a between the front and surroundings of the module and the metal frame or metal parts of the mobile phone is kept at 60° or above. The back of the module is fixed on the metal middle frame with thermal glue. In the embodiment of the present application, the thickness of the side plastic casing corresponding to the radiation front of the second millimeter-wave antenna module 62 and the third millimeter-wave antenna module 63 is 3.3 mm. The distance between the side plastic shell and the second millimeter-wave antenna module 62 (or the third millimeter-wave antenna module 63) is 0.6 mm. For example, both the second connector 32 and the third connector 34 are IPEX BTB connectors. Both the first transmission line 33 and the second transmission line 35 are LCP transmission lines. LCP transmission lines are used behind the second millimeter-wave antenna module 62 and the third millimeter-wave antenna module 63. The signals of the second millimeter-wave antenna module 62 and the third millimeter-wave antenna module 63 are connected to the main board 30. The transfer between the LCP transmission line and the second millimeter-wave antenna module 62 and the third millimeter-wave antenna module 63 adopts IPEX BTBJ1 and J2 board-to-board interfaces. The transfer between the LCP transmission line and the main board 30 adopts IPEX BTBJ1 and J2 board-to-board interfaces.

Figure 12:
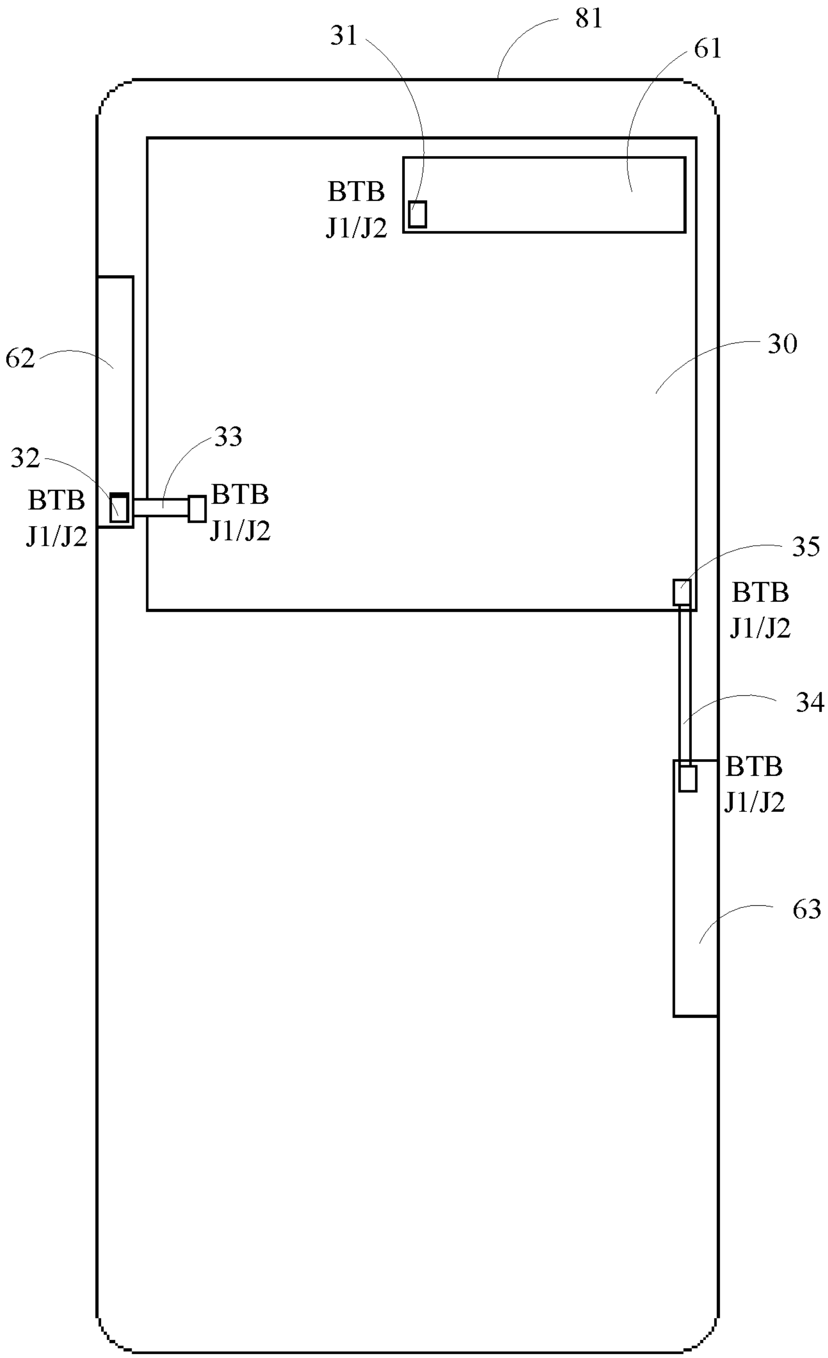
FIG. 12 is a schematic diagram of a fifth structure of a second antenna assembly provided by an embodiment of the present application.

For example, the second millimeter-wave antenna module 62 and the third millimeter-wave antenna module 63 disposed on the side are both in the non-sub-6 GHz antenna area. Therefore, both the performance of the millimeter-wave antenna and the performance of other sub-6 GHz antennas are taken into account. In addition, considering the various scenarios used by the user, try to avoid losing the signal due to the antenna module being held by the user. The positions of the second millimeter-wave antenna module 62 and the third millimeter-wave antenna module 63 may be respectively distributed on the upper half and the lower half of the mobile terminal 100, as shown in FIG. 12.

For example, the mobile terminal 100 takes a mobile phone as an example, and a 5G mobile phone provided by the embodiment of the present application is compatible with a sub-6G antenna and a millimeter-wave antenna. Specifically, on a full-screen mobile phone with a headroom of 1.5 mm above and below, 8 slots are opened and 10 antennas are deployed. This enables low-frequency 2×2 MIMO for 2G/3G/4G/5G, mid-high frequency and sub-6G frequency band 4×4 MIMO for 2G/3G/4G/5G, Wi-Fi 2×2 MIMO, dual-frequency GPS, and 2×2MIMO functions of n258, n260, and n261 of 5G millimeter-wave basically cover the frequency bands of global operators. 2G/3G/4G/5G low-frequency 2×2 MIMO, that is, there are two antennas at low frequency, which are the main antenna and the diversity antenna. 2G/3G/4G/5G mid-high frequency and sub-6G frequency band 4×4 MIMO, that is, mid-frequency, high-frequency, sub-6G frequency band, each has 4 antennas, which are the main set antenna, diversity antenna, and the third MIMO antenna and a 4th MIMO antenna (the third MIMO antenna and the fourth MIMO antenna are collectively referred to as MIMO antennas).

The frequency range of the low frequency band is 699-960 MHz. The frequency range of the IF band is 1710-2200 MHz. The frequency range of the high frequency band is 2300-2690 MHz. In the sub-6G frequency band of 5G, the frequency range of the n77 frequency band is 3.3-4.2 GHz, and the frequency range of the n79 frequency band is 4.4-5.0 GHz. The frequency range of Bluetooth or Wi-Fi 2.4 G is 2400-2500 MHz. The frequency range of the GPS L1 band is 1575 MHz. The frequency range of the GPS L5 band is 1176 MHz. The frequency range of the n258 band is 24250-27500 MHz. The frequency range of the n260 band is 37000-40000 MHz. The frequency range of the n258 band is 27500-28350 MHz.

FIG. 13 shows the performance of the millimeter-wave antenna of the whole machine. The data shows that the performance of the millimeter-wave antenna of this solution basically meets the requirements of Verzon OTA. This fully meets 3GPP, TMO US, AT&T millimeter-wave antenna requirements. According to the measurement standard of CTIA (USA wireless communications and internet association), the measurement of the wireless performance of the wireless terminal is defined as OTA (over-the-air, space port communication performance) measurement. The basic idea of OTA measurement is to measure the TRP (total radiated power) of the terminal by measuring the EIRP (effective isotropic radiated power, equivalent isotropic radiated power) radiated from the wireless terminal in different directions. EIRP is the product of the power obtained by the antenna and the gain expressed by the antenna in dBi, reflecting the power radiated by the antenna in all directions. The TIS (total isotropic sensitivity) of the terminal is determined by measuring the EIS (effective isotropic sensitivity, equivalent omnidirectional sensitivity) of the wireless terminal in different directions. Peak EIRP stands for peak equivalent isotropic radiated power. EIRP stands for equivalent isotropic radiated power. EIS stands for equivalent isotropic sensitivity. EIRP_0.5CDF represents the equivalent isotropic radiated power corresponding to a cumulative distribution function CDF of 0.5. EIS_0.5CDF represents the equivalent omnidirectional sensitivity corresponding to the cumulative distribution function CDF of 0.5, and the unit is dBm. FS, BHH, and H all indicate the test method of the antenna. FS means free field test, BHH means head plus hand test, and H means hand test.

The embodiment of this application provides a complete implementation solution for a 5G mobile terminal compatible with a sub-6 GHz antenna and a millimeter-wave antenna. Not only the sub-6 GHz antenna performance realizes the functions of low frequency 2×2 MIMO, mid-high frequency 4×4 MIMO, and sub-6G frequency band (n77 and n79) 4×4 MIMO, but also covers the frequency bands of mainstream operators around the world. The embodiment of this application also supports Wi-Fi 2×2 MIMO (including Wi-Fi 2.4G and Wi-Fi 5G) and dual-frequency GPS (GPS L1 and L5) functions. In addition, the antenna design of the 5G millimeter wave frequency band (n258, n260, n261) defined by 3GPP has been realized. The millimeter-wave antenna basically complies with the technical indicators defined by various operators in North America and 3GPP.

The antenna system including the first antenna assembly 50 and the second antenna assembly 60 in the embodiment of the present application takes into account both head-and-hand performance and SAR (specific absorption rate, electromagnetic wave absorption ratio) requirements, and fully considers user usage scenarios. The antenna system in the embodiments of the present application is not only applicable to mobile terminals with a plastic appearance, but also applicable to mobile terminals with a metal appearance.

As can be seen from the above, the mobile terminal 100 provided by the embodiment of the present application includes a casing, and a main board, an antenna bracket 40, a first antenna assembly 50, and a second antenna assembly 60 disposed in the casing, wherein the first antenna assembly 50 and the second antenna assembly 60 are electrically connected to the main board; wherein the casing comprises a metal frame 81 and a rear cover, and the metal frame 81 is provided with a plurality of slots to divide the metal frame 81 into a plurality of metal parts arranged at intervals; wherein the antenna bracket 40 is provided with a plurality of wirings; wherein the first antenna assembly 50 comprises a plurality of antenna structures, the plurality of antenna structures are formed based on the plurality of metal parts arranged at intervals and the plurality of wirings, and a working frequency band of the plurality of antenna structures is a sub-6G frequency band; and wherein the second antenna assembly 60 comprises a plurality of millimeter-wave antenna modules, and a working frequency band of the plurality of millimeter-wave antenna modules is a millimeter-wave frequency band. The embodiment of the present application can provide compatibility with sub-6G antennas and millimeter-wave antennas, basically covering frequency bands of global operators, and improving antenna performance.

The mobile terminal provided by the embodiment of the present application has been introduced in detail above. In the descriptions, specific examples are used to illustrate the principles and implementation methods of the present application. The descriptions of the above embodiments are only for helping the understanding of the present application. In addition, for those skilled in the art, there may be changes in specific implementation methods and application scopes based on the idea of the present application. To sum up, the contents of this specification should not be understood as limiting the present application.

What is claimed is:

1. A mobile terminal, comprising:

a casing, and a main board, an antenna bracket, a first antenna assembly, and a second antenna assembly disposed in the casing, wherein the first antenna assembly and the second antenna assembly are electrically connected to the main board;

wherein the casing comprises a metal frame and a rear cover, and the metal frame is provided with a plurality of slots to divide the metal frame into a plurality of metal parts arranged at intervals;

wherein the antenna bracket is provided with a plurality of wirings;

wherein the first antenna assembly comprises a plurality of antenna structures, the plurality of antenna structures are formed based on the plurality of metal parts arranged at intervals and the plurality of wirings, and a working frequency band of the plurality of antenna structures is a sub-6G frequency band; and wherein the second antenna assembly comprises a plurality of millimeter-wave antenna modules, and a working frequency band of the plurality of millimeter-wave antenna modules is a millimeter-wave frequency band.

2. The mobile terminal of claim 1, wherein the metal frame comprises a bottom frame, a top frame, a first side frame, and a second side frame, the bottom frame is provided with a first slot and a second slot, the first side frame is provided with a third slot, a fourth slot, and a fifth slot, and the second side frame is provided with a sixth slot, a seventh slot, and an eighth slot.

3. The mobile terminal of claim 2, wherein the first antenna assembly comprises a first antenna structure, the first antenna structure comprises a first metal part, a first wiring, a first feed point, and a first ground point, the first metal part is located between the first slot and the third slot, a first end of the first metal part is coupled to the first ground point, a second end of the first metal part extends to the first slot, a first end of the first wiring is coupled to the second end of the first metal part, and the first feed point is located at a designated position of the first end of the first wiring; and wherein the first antenna structure is configured to form resonant frequencies of a mid-high frequency and a n79 frequency band.

4. The mobile terminal of claim 2, wherein the first antenna assembly comprises a second antenna structure, the second antenna structure comprises a second metal part, a second wiring, and a second feed point, and a second ground point, the second metal part is located between the first slot and the second slot, a first end of the second metal part extends to the first slot, a second end of the second metal part extends to the second slot, a first end of the second wiring is coupled to the second end of the second metal part, and the second feed point is located at a designated position of the first end of the second wiring; and wherein the second antenna structure is configured to form resonance frequencies of an intermediate frequency and a n77 frequency band.

5. The mobile terminal of claim 4, wherein the second antenna structure further comprises a first matching circuit, the first matching circuit comprises a first inductor and a first capacitor, the first inductor is connected in parallel at a position of the second feed point, and then the first capacitor is connected in series, and the first matching circuit is configured to cooperate with the second metal part to form the resonant frequency of the intermediate frequency.

6. The mobile terminal of claim 2, wherein the first antenna assembly comprises a third antenna structure, the third antenna structure comprises a third metal part, a third wiring, a third feed point, and a second ground point, the third metal part is located between the second slot and the eighth slot, the first end of the third metal part extends to the second slot, a first end of the third metal part is coupled to the second ground point, a second end of the third metal piece extends to the second slot, a first end of the third wiring is connected to a designated position of the first end of the third metal part, and the third feed point is located at a designated position of the first end of the third wiring; and wherein the third antenna structure is configured to form resonance frequencies of a low frequency, a high frequency, a n77 frequency band, and a n79 frequency band.

7. The mobile terminal of claim 6, wherein the third antenna structure further comprises a first switch, the first switch is coupled to the third metal part, and the first switch is configured to switch between different low frequency bands.

8. The mobile terminal of claim 2, wherein the first antenna assembly comprises a fourth antenna structure, the fourth antenna structure comprises a fourth metal part, a fourth wiring, a fifth wiring, a sixth wiring, a seventh wiring, an eighth wiring, a fourth feed point, and a third ground point, the fourth metal part is located between the third slot and the fourth slot, a first end of the fourth metal part extends to the fourth slot and is coupled to the third ground point, a second end of the fourth metal part is coupled to the fourth feed point, a first end of the seventh wiring is respectively coupled to a second end of the fourth metal part and a first end of the fifth wiring, the sixth wiring and the eighth wiring are coupled to the seventh wiring, and a first end of the fourth wiring is coupled to a second end of the fifth wiring; and wherein the fourth antenna structure is configured to form resonance frequencies of a frequency band corresponding to a L5 band of GPS, a 2.4 GHz frequency band of Wi-Fi, and a 5 GHz frequency band of Wi-Fi.

9. The mobile terminal of claim 8, wherein the fourth antenna structure further comprises a second matching circuit, the second matching circuit comprises a second inductor, the second inductance is connected in parallel at a position of the fourth feed point, and the second matching circuit is configured to increase resonance gains of the frequency band corresponding to the L5 band of GPS and the resonance frequency of the 2.4 GHz frequency band of Wi-Fi.

10. The mobile terminal of claim 2, wherein the first antenna assembly comprises a fifth antenna structure and a fourth ground point, the metal part located between the fifth slot and the sixth slot is divided into a fifth metal part and a sixth metal part by a fourth ground point connected to the metal part;

wherein the fifth antenna structure comprises the fifth metal part, a ninth wiring, and a fifth feed point, a first end of the fifth metal part is coupled to the fourth ground point, a second end of the fifth metal part extends to the fifth slot, a first end of the ninth wiring is coupled to the fifth metal part, and the fifth feed point is located at a designated position of a first end of the ninth wiring; and wherein the fifth antenna structure is configured to form resonant frequencies of a frequency band corresponding to a L1 band of GPS, a 2.4 GHz frequency band of Wi-Fi, and a 5 GHz frequency band of Wi-Fi.

11. The mobile terminal of claim 10, wherein the fifth antenna structure further comprises a third matching circuit, the third matching circuit comprises a third inductor and a second capacitor, at a position of the fifth feed point, the second capacitor is connected in series, and then the third capacitor is connected in parallel, and the third matching circuit is configured to cooperate with the fifth metal part to form a resonant frequency of a frequency band corresponding to the L1 band of GPS.

12. The mobile terminal of claim 10, wherein the first antenna assembly further comprises a sixth antenna structure, the sixth antenna structure comprises the sixth metal part, a tenth wiring, and a sixth feed point, the sixth metal part comprises a body part and a bent part, wherein a first end of the body part of the sixth metal part is coupled with the fourth ground point, a second end of the bent part of the sixth metal part extends to the sixth slot, a first end of the tenth wiring is coupled to the sixth metal part, and the sixth feed point is located at a designated position of the first end of the tenth wiring; and wherein the sixth antenna structure is configured to form resonance frequencies of a low frequency, a mid-high frequency, a n77 frequency band, and a n79 frequency band.

13. The mobile terminal of claim 12, wherein the sixth antenna structure further comprises a fourth matching circuit, the fourth matching circuit comprises a third capacitor, the third capacitor is connected in series at a position of the sixth feed point, and the fourth matching circuit is configured to cooperate with the body part of the sixth metal part to form a low-frequency resonance frequency.

14. The mobile terminal of claim 12, wherein the sixth antenna structure further comprises a second switch, the second switch is coupled to the body part of the sixth metal part, and the second switch is configured to switch different low frequency bands.

15. The mobile terminal of claim 2, wherein the first antenna assembly comprises a seventh antenna structure, the seventh antenna structure comprises a seventh metal part, a seventh feed point, and a fifth ground point, the seventh metal part is located between the sixth slot and the seventh slot, a first end of the seventh metal part extends to the sixth slot and is coupled to the fifth ground point, and a second end of the seventh metal part extends to the seventh slot and is coupled with the seventh feed point;

wherein the seventh antenna structure is configured to form resonant frequencies of a mid-high frequency, a frequency band n77, and a frequency band n79.

16. The mobile terminal of claim 15, wherein the seventh antenna structure further comprises a fifth matching circuit, the fifth matching circuit comprises a fourth inductor and a fourth capacitor, at a position of the seventh feed point, the fourth capacitor is connected in series, and then the fourth inductor is connected in parallel, and the fifth matching circuit is configured to cooperate with the seventh metal part to form a resonant frequency of a low frequency.

17. The mobile terminal of claim 2, wherein an avoidance angle between each of the millimeter-wave antenna modules in the second antenna assembly and the metal frame is greater than a signal scanning angle of each of the millimeter-wave antenna modules.

18. The mobile terminal of claim 17, wherein the second antenna assembly comprises a first millimeter-wave antenna module, the first millimeter-wave antenna module is disposed adjacent to the top frame, the first millimeter-wave antenna module is electrically connected to the main board through a first connector, and a radiation direction of the first millimeter-wave antenna module is perpendicular to the rear cover.

19. The mobile terminal of claim 17, wherein the second antenna assembly comprises a second millimeter-wave antenna module, the metal part between the fourth slot and the fifth slot on the first side frame is replaced by a first non-metal filler, the second millimeter-wave antenna module is disposed adjacent to the first non-metallic filler, the second millimeter-wave antenna module is electrically connected to the main board through a second connector and a first transmission line, and a radiation direction of the second millimeter-wave antenna module is perpendicular to the first non-metal filler.

20. The mobile terminal of claim 17, wherein the second antenna assembly comprises a third millimeter-wave antenna module, the metal part between the seventh slot and the eighth slot on the second side frame is replaced by a second non-metal filling piece, the third millimeter-wave antenna module is disposed adjacent to the second non-metallic filler, the third millimeter-wave antenna module is electrically connected to the main board through a third connector and a second transmission line, and a radiation direction of the third millimeter-wave antenna module is perpendicular to the second non-metal filler.

* * * * *